C. A. HOEFER.
VALVE INSERTING MACHINE.
APPLICATION FILED SEPT. 16, 1908.
955,334.
Patented Apr. 19, 1910.
3 SHEETS—SHEET 1.
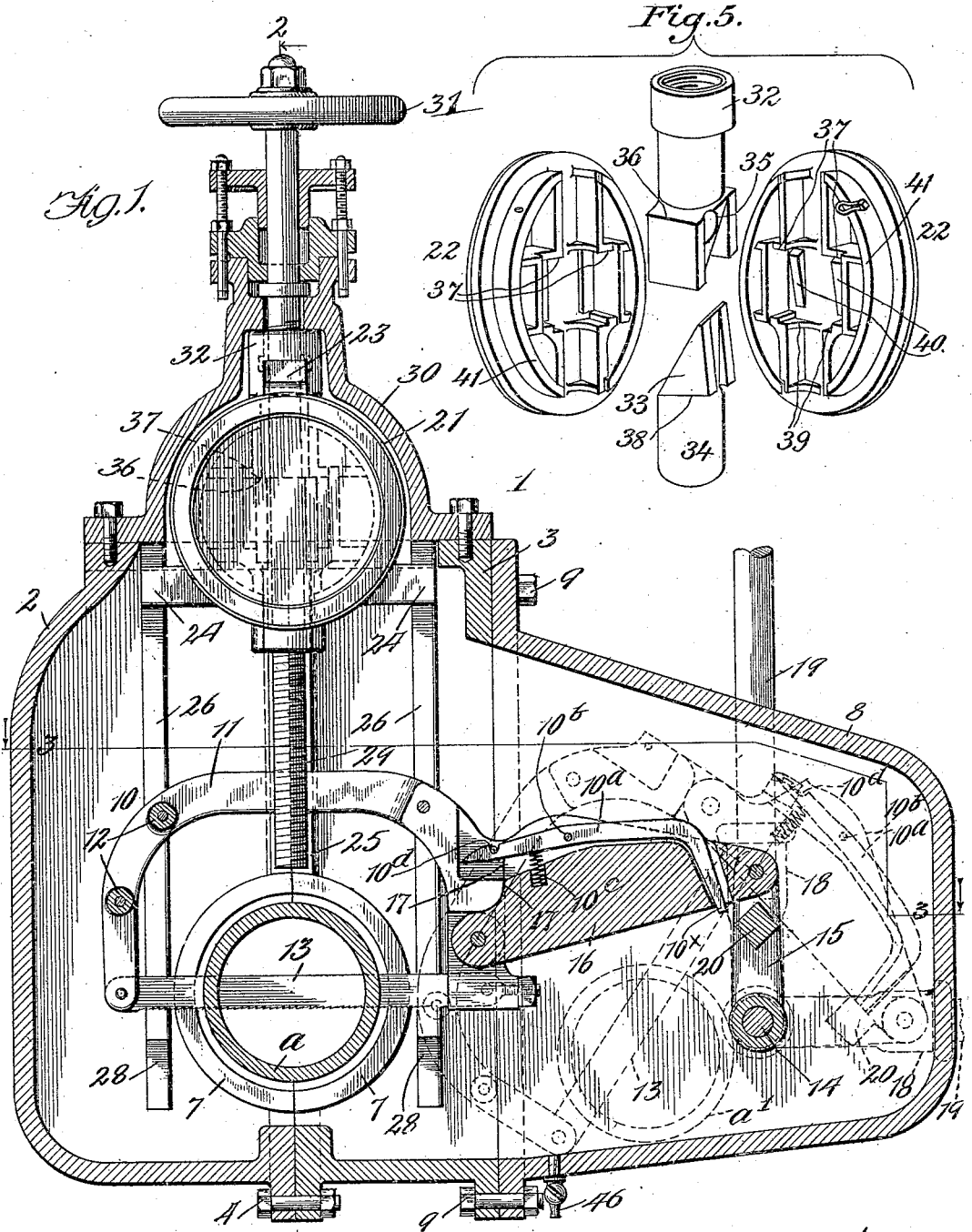
Witnesses:
Ia D. Perry
H. G. Barrett
Inventor:
Chester A. Hoefer
By Luther L. Miller
Atty.

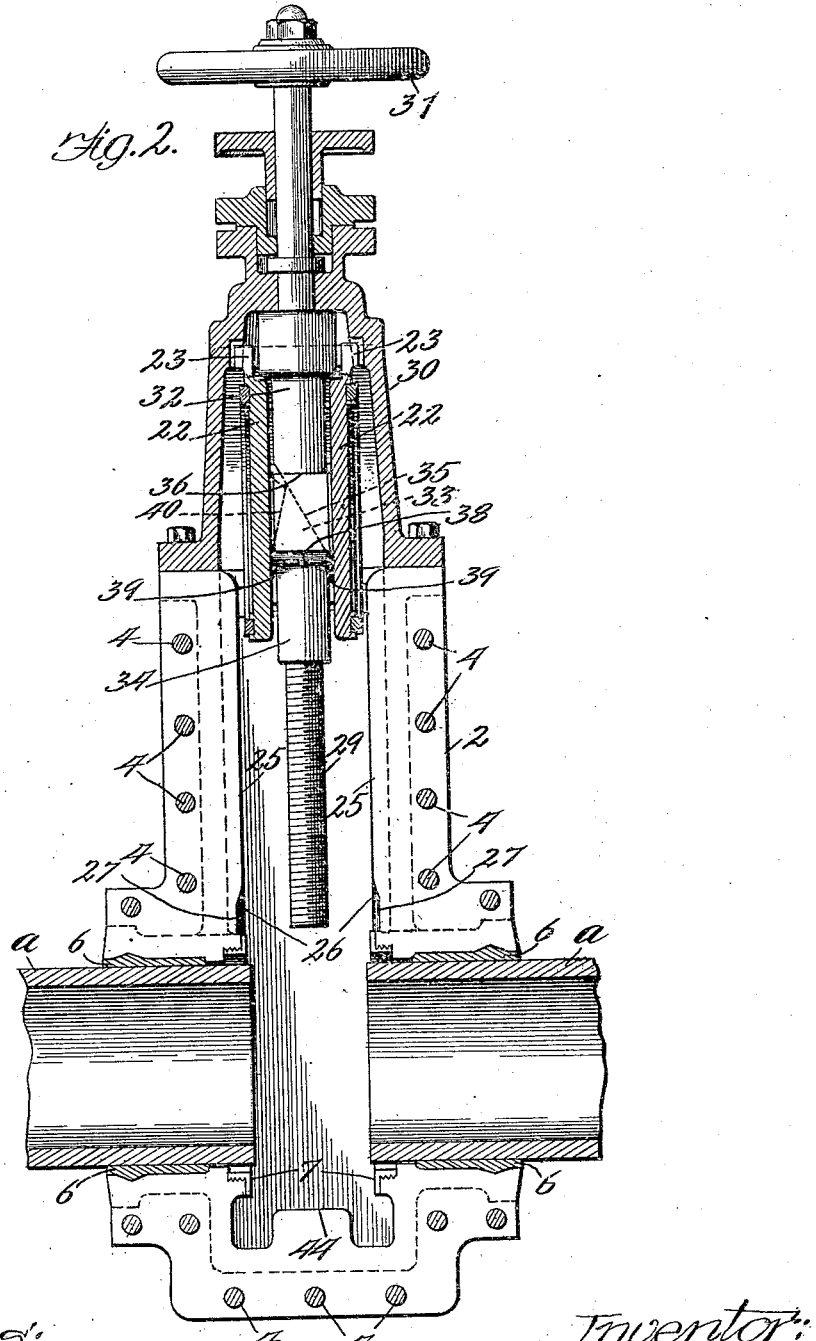

C. A. HOEFER.
VALVE INSERTING MACHINE.
APPLICATION FILED SEPT. 16, 1908.
955,334.
Patented Apr. 19, 1910.
3 SHEETS—SHEET 3.
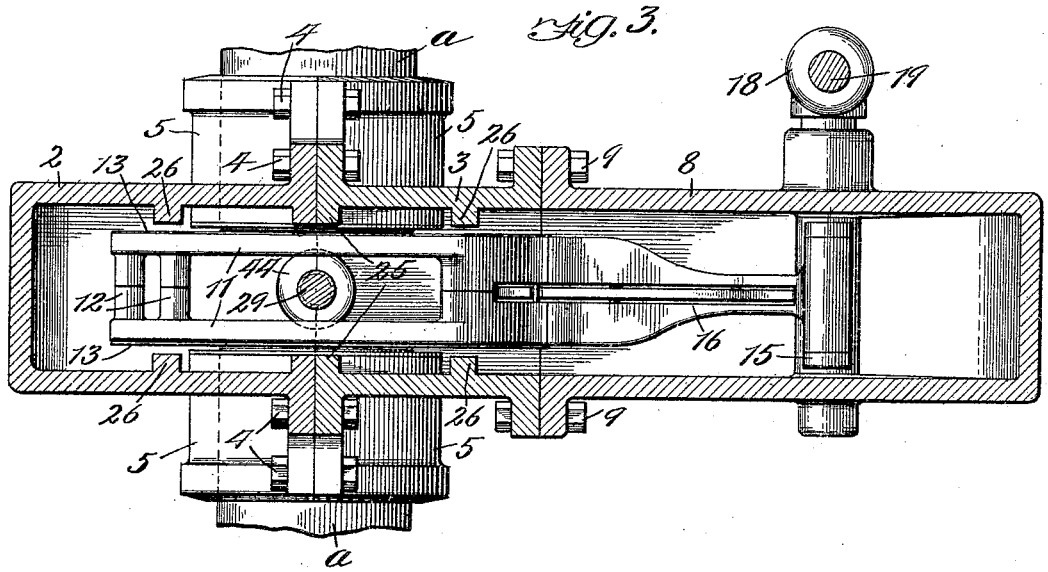
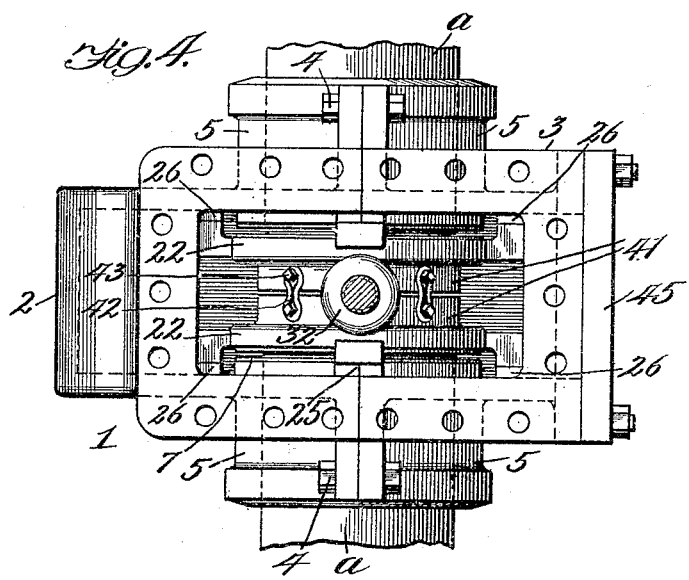
Witnesses:
Ira D. Perry
H. G. Barrett
Inventor:
Chester A. Hoefer
By Luther L. Miller
Atty.

UNITED STATES PATENT OFFICE.

CHESTER A. HOEFER, OF FREEPORT, ILLINOIS, ASSIGNOR TO HOEFER MANUFACTURING COMPANY, OF FREEPORT, ILLINOIS, A CORPORATION OF ILLINOIS.

VALVE-INSERTING MACHINE.

955,334.

Specification of Letters Patent. Patented Apr. 19, 1910.

Application filed September 16, 1908. Serial No. 453,246.

*To all whom it may concern:*

Be it known that I, CHESTER A. HOEFER, a citizen of the United States, residing at Freeport, in the county of Stephenson and State of Illinois, have invented certain new and useful Improvements in Valve-Inserting Machines, of which the following is a specification.

The object of this invention is to provide means for inserting a valve into a pipe with a minimum interruption of the flow through said pipe.

The embodiment which I have selected for the purpose of illustrating the invention comprises a sectional valve casing which may be permanently secured upon the pipe at the point where the valve is to be inserted, said casing containing the valve mechanism and being large enough to accommodate a pipe-cutting mechanism. The latter is carried by a casing section which is temporarily attached to an open side of the valve casing in a fluid-tight manner so as to inclose the pipe-cutting mechanism in the valve casing. After a section of the pipe has been removed, the valve is closed to shut off the flow long enough to permit of detaching the casing-section that carries the pipe-cutting mechanism, and permanently closing the before-mentioned open side of the valve casing.

In the accompanying drawings, Figure 1 is a sectional view through an apparatus embodying the features of my invention, said apparatus being shown in operative relation to a pipe. Fig. 2 is a sectional view taken on the plane of dotted line 2 2 of Fig. 1. Fig. 3 is a section on line 3 3 of Fig. 1. Fig. 4 is a top plan view with the dome of the valve casing omitted. Fig. 5 is a detail perspective view of the parts of the valve device.

In the drawings, *a* refers to a pipe in which a valve is to be inserted. The valve casing 1 comprises, in this instance, two sections 2 and 3 divided in a plane extending centrally and longitudinally of the pipe, said sections, as herein shown, being secured together by means of bolts 4 and having semi-cylindrical flanges 5 to embrace the pipe. A fluid-tight connection between the casing and the pipe may be obtained in any suitable way, as by filling the space between the pipe and the flanges 5 with lead 6 (Fig. 2) or any preferred packing material. The valve seats are carried by the valve casing, and, as herein shown, each consists of two semi-circular sections 7 of suitable material secured to the casing-sections 2 and 3. The means for removing the portion of the pipe extending between the valve seats 7 will next be described.

In the present embodiment, the outer side of the casing section 3 is open and is arranged to be closed by a casing section 8 that may be removably secured to the casing section 3, as by means of bolts 9. The casing section 8 carries the pipe-cutting mechanism, which latter, in this instance, comprises a yoke 10 consisting of two side pieces 11 suitably connected together and braced by cross-pieces 12. Between the arms of the yoke 10 are secured two saw blades 13. The yoke 10, as will be understood, is of sufficient size to receive the pipe within it as the saw blades descend into the pipe.

The means herein shown for reciprocating the saws 13 comprises a shaft 14 rotatably supported in the opposite walls of the casing section 8 and carrying inside the casing a crank arm 15 to which the saw-frame 10 is connected by means of a link 16. The link 16 and the saw-frame 10 have coöperating shoulders 17 (Fig. 1) to limit pivotal movement between said frame and said link in one direction. Outside the casing section 8, the shaft 14 has fixed thereon a socket 18 for the reception of an operating lever 19. When the operating lever 19 is rocked, the saws 13 are reciprocated to sever the section of pipe between the valve seats 7. In order to prevent pivotal movement between the saw-frame 10 and the link 16 during the cutting operation and thus prevent the saws from rocking on the pipe when beginning or finishing the cut, I provide a latch $10^a$ pivoted at $10^b$ on said link and normally held by a spring $10^c$ in engagement with a pin $10^d$ on the saw-frame. When the section of pipe between the valve seats has been cut off, it is drawn to one side by tilting the operating lever 19 into the position shown in dotted lines in Fig. 1, the engagement of the link 16 with a stop 20 on the arm 15 causing said link to swing upward into the dotted-line position indicated in Fig. 1, and the engagement of the tail $10^x$ of the latch $10^a$ with the stop 20 causing said latch to release the saw-frame 10, said frame and the pipe-section $a'$ within it being drawn to one side of the pipe.

The valve member 21 may be of any common or preferred construction. I have herein indicated a double-gate expansible valve of a well-known type and have deemed it unnecessary to illustrate it in detail. It comprises the two circular gates 22 adapted to seat upon the valve seats 7 and having depressed faces to receive the ends of the pipe projecting beyond said seats. Each gate 22 has an upper guide-lug 23 and two side guide lugs 24 arranged to slide upon guide ribs 25 and 26, respectively, on the valve casing 1. The guide-ribs 25 and 26 are recessed at 27 and 28, respectively, in order to permit the valve member 21 to expand and seat itself on the seat rings 7.

The means herein shown (see Fig. 5) for raising, lowering and expanding the valve member 21 comprises a screw-threaded stem 29 rotatably supported in the dome 30 and provided with an operating hand wheel 31. Said screw stem engages a member 32 and extends loosely through a wedge 33 having a tubular stop lug 34 on its lower end. The member 32 has a wedging surface 35 coacting with the wedge 33, and has shoulders 36 which underlie projections 37 on the gates 22. Shoulders 38 on the wedge 33 overlie projections 39 on the gates 22. The wedge 33 operates against wedging surfaces 40 on one of the valve gates. Said gates have inwardly extending annular flanges 41. Links 42 engaging headed screws 43 in the flanges 41 loosely secure the gates 22 together.

When the screw stem 29 is rotated to lower the valve member 21 the stop lug 34 strikes against a boss 44 on the bottom of the valve casing, and continued rotation of the screw causes the gates 22 to be spread apart and firmly seated against the seat rings 7. When the screw is rotated to raise the valve member, the shoulders 36 on the member 32 engage and lift the gates 22, and the latter engage under the shoulders 38 on the wedge 33 and raise said wedge. The fluid pressure causes the valve member 21 to contract sufficiently to clear the projecting ends of the pipe as said valve member is raised.

45 (Fig. 4) is a plate to be secured to the open side of the casing section 3 after the section 8 has been removed. A pet cock 46 permits of draining the fluid from the valve casing after the valve member 21 has been seated and before the casing section 8 is removed.

In practice, the casing sections 2 and 3 are bolted onto the pipe at the point where it is desired to insert a valve, a fluid-tight joint formed between the valve casing and the pipe, the casing section 8 attached to the casing section 3 with the saws 13 resting upon the pipe—and the dome 30 carrying the valve member 21 and the screw stem 29 secured in place. The lever 19 is then operated to reciprocate the saws 13. If desired the saws 13 may be reciprocated a few times before the dome 30 is bolted on, in order that the operator may satisfy himself that everything is in working order. As the saws cut through the pipe, the valve casing, including the casing section 8, fills with fluid. When a section $a'$ has been cut out of the pipe the lever 19 is tilted into the position indicated in dotted lines in Fig. 1, drawing the saws and the severed pipe-section away from the pipe. The valve member 21 is now seated by operating the hand wheel 30, thus shutting off the flow through the pipe. The valve casing having been drained by opening the pet cock 46, the casing section 8 is removed and the plate 45 bolted in place. It will be observed that the flow through the pipe is interrupted only while the casing section 8 is being removed and the plate 45 substituted therefor, an operation which consumes but a very few minutes.

I wish it to be understood that I desire not to be limited to the details of construction shown and described, as many modifications will occur to persons skilled in the art.

I claim as my invention:

1. The combination of a valve casing comprising two sections adapted to embrace a pipe and be permanently attached directly to said pipe, and a removable section secured to the casing; a pipe-severing mechanism carried by said removable section; a valve member in said casing, and means for inserting said valve member in the space between the ends of the severed pipe-sections to control the flow through the pipe.

2. The combination, in a valve-inserting machine, of a valve casing comprising sections adapted to embrace a pipe, a dome, and a removable casing-portion; a pipe-cutting mechanism carried by said removable casing-portion; and a valve member carried by said dome, said valve member being adapted for insertion between the ends of the severed pipe-sections to control the flow through the pipe.

3. In a valve-inserting machine, in combination, a sectional casing adapted to fit over and inclose a portion of a pipe, a valve seat attached to said casing and surrounding the inclosed portion of the pipe, a valve and valve-operating means carried by said casing, said valve being adapted to said seat, and a pipe-cutting mechanism in said casing.

4. In a valve-inserting machine, in combination, a sectional casing adapted to fit over and inclose a portion of a pipe, two opposing valve seats in said casing surrounding the inclosed portion of the pipe, guideways in said casing, a double-gate valve slidable on said guideways and adapted to said seats, means attached to said casing and said valve for moving the latter, and a pipe-cutting mechanism in said casing.

5. In a valve-inserting machine, in combination, a sectional valve casing adapted to fit over and inclose a portion of a pipe, a mechanism carried by said casing for controlling the flow through the pipe to be cut, said mechanism comprising a valve member movable into and out of operative position, and means for moving said valve member, said valve-moving means being located at and operable from one side of said casing, and a pipe-cutting mechanism within said casing and removable through another side of said casing.

6. In a valve-inserting machine, in combination, a valve casing adapted to fit over and inclose a portion of a pipe, a valve and valve-moving means carried by said casing, said valve being adapted to be placed across the severed pipe to control the flow therethrough, a removable section for said casing, pipe-cutting means in said section, and means for moving said cutting means into operative relation to the pipe and for withdrawing it into said section, the latter being adapted to contain said cutting means when said valve has been placed in operative relation to the pipe.

7. The combination of a valve casing comprising two sections adapted to embrace a pipe and be permanently attached directly to said pipe, a removable side section secured to the casing; a dome; a valve and valve-moving means carried by said dome; pipe-cutting means in said side section; and means for moving said cutting means into operative relation to the pipe and for withdrawing it into said side section, the latter being adapted to contain said cutting means when said valve has been lowered into operative relation to the pipe.

8. The combination of a valve casing adapted to be attached to a pipe with said pipe extending through it, said casing having a valve-containing chamber at one side of the pipe and a removable section at another side of said pipe; a screw-threaded stem in said chamber; a valve member mounted on said stem and movable by said stem out of said chamber and across the axial line of the pipe; and a cutting mechanism carried by said removable section and comprising two spaced saw-carrying members adapted to lie at opposite sides of said stem, said removable section being adapted to contain said cutting mechanism when said valve member has been placed in position to cut off flow within said pipe.

9. The combination of a sectional casing adapted to be permanently attached directly to a pipe with said pipe extending through it, two opposing valve seats fixed to said casing and surrounding the inclosed portion of the pipe, guide-ways in said casing at one side of said valve seats, a double-gate valve slidable on said guideways and adapted to said seats, means at one side of said seats for moving said valve, and a pipe-cutting mechanism is said casing at another side of said valve seats.

10. The combination of a valve casing adapted to be attached to a pipe with said pipe extending through it, said casing having a valve-containing chamber at one side of the pipe and a removable section at another side of said pipe; a valve operatively mounted in said chamber; and a reciprocatory pipe-severing means attached to said removable section; said pipe-severing means being adapted to engage the severed pipe section and draw it out of the line of the pipe and into said removable section.

11. The combination of a casing adapted to be attached to a pipe with said pipe extending through it, said casing being divided in a plane extending through the axis of the pipe into two sections adapted to embrace the pipe, said casing being enlarged to provide a valve-receiving chamber at one side of the pipe, said casing also comprising a dome overlying and removably secured to both of said sections at one end of said chamber, one of said sections having a removable chambered side-portion; valve mechanism attached to said dome; and pipe cutting mechanism attached to and adapted to be contained in said chambered side-portion.

12. The combination of a casing adapted to be attached to a pipe, said casing having a valve-containing chamber and a removable chambered section, said chambered section being disposed at one side of the axis of the pipe; valve mechanism in said valve-containing chamber; two spaced saws; and means in said chambered section for reciprocating said saws across the pipe and for withdrawing them into said chambered section.

CHESTER A. HOEFER.

Witnesses:
ADELA V. LEITHNER,
F. W. HOEFER.